United States Patent [19]
Bridges

[11] Patent Number: 4,731,888
[45] Date of Patent: Mar. 22, 1988

[54] CONVERTIBLE VAN SOFA

[76] Inventor: Bobby L. Bridges, Rte. 2, Box 3492, Nicholson, Ga. 30565

[21] Appl. No.: 940,336

[22] Filed: Dec. 11, 1986

[51] Int. Cl.[4] ............................................. A47C 17/04
[52] U.S. Cl. ......................................... 5/37 R; 5/41; 5/47; 5/18 B
[58] Field of Search ............... 5/17, 18 R, 18 B, 37 R, 5/37 C, 41, 47, 48

[56] References Cited

U.S. PATENT DOCUMENTS

| | | | |
|---|---|---|---|
| 169,099 | 10/1875 | Goodwin | 5/18 B |
| 1,126,894 | 2/1915 | Sisbower | 5/18 B |
| 4,001,901 | 1/1977 | Quakenbush | 5/18 R |
| 4,321,716 | 3/1982 | Shrock | 5/18 R |
| 4,563,784 | 1/1986 | Shrock et al. | 5/18 R |

FOREIGN PATENT DOCUMENTS 1248724  11/1960  France ........................ 5/41

Primary Examiner—Alexander Grosz
Assistant Examiner—Michael F. Trettel
Attorney, Agent, or Firm—Fleit, Jacobson, Cohn & Price

[57] ABSTRACT

A base frame is provided as well as a seat support and a seat back support. Mounting structure supports the supports from the frame for movement between first seat defining positions and second bed defining positions. The seat support is horizontally disposed and projects slightly forward of a forward marginal portion of the base frame when in the seat defining position and projects further forward from the base frame when in the bed defining position. The seat back support is disposed in horizontal position immediately rearward of the seat support when in the bed defining position and is disposed in an upstanding position spaced above and projecting upwardly from rear marginal portion of the seat support when in the seat defining position. The seat back support is mounted from the base frame through the utilization of lazy tong linkages and the seat support is mounted from the base frame through the utilization of rear marginal edge supported depending brackets pivotally mounted from front to rear shiftable followers mounted from the base frame and to which the lazy tong linkages are also supported.

11 Claims, 6 Drawing Figures

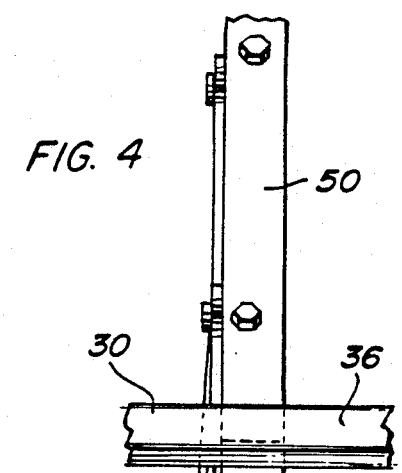
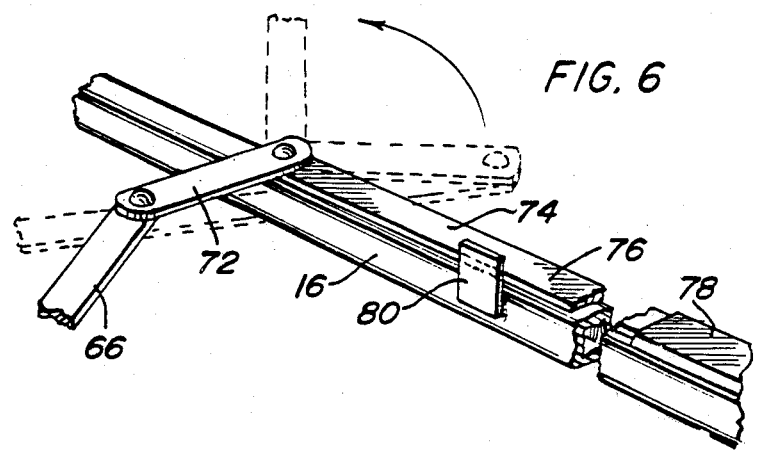
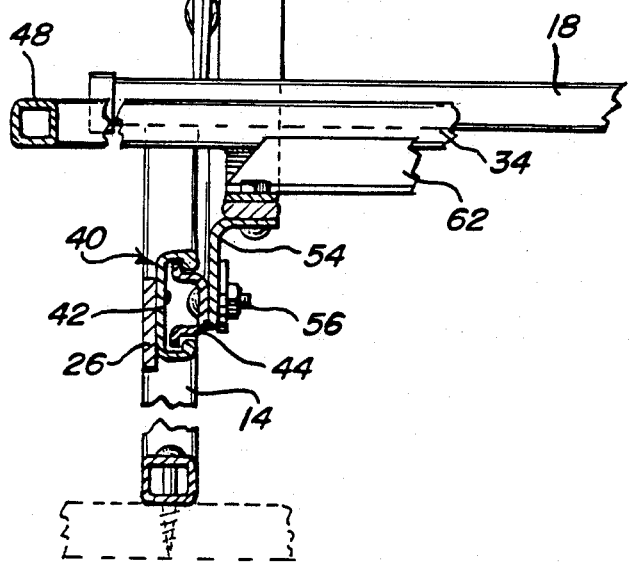
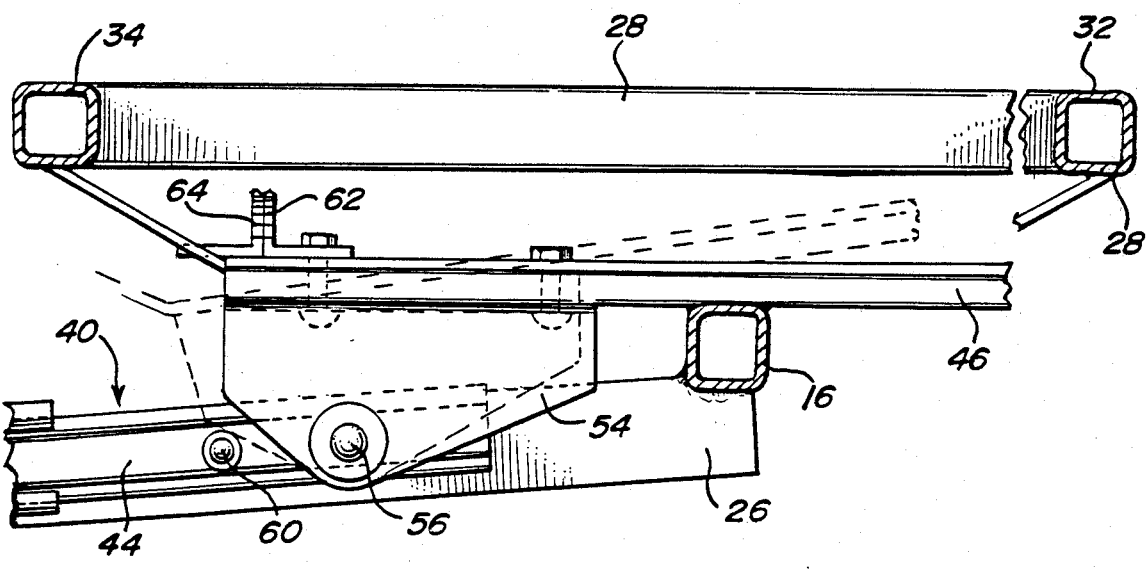
FIG. 4
FIG. 6
FIG. 5

CONVERTIBLE VAN SOFA

BACKGROUND OF THE INVENTION

1. Field of the Invention

This invention relates to a convertible seat-bed assembly for use in a vehicle and is constructed whereby the assembly may be readily converted between a seat defining arrangement and a bed defining arrangement.

2. Description of Related Art

Various different forms of convertible seat-bed assemblies heretofore have been provided such as those disclosed in U.S. Pat. Nos. 2,718,256, 3,634,893, 3,913,152, 4,037,872, 4,104,747, 4,131,960, 4,321,716, 4,512,048, 4,543,675, 4,563,784 and 4,569,093. However, these previously known forms of convertible seat-bed assemblies do not include the structural and operational features of the instant invention which coact to provide a convertible seat-bed that may be readily shifted between a seat defining position and a bed defining position, which is readily manually actuatable, which is provided with an actuating mechanism specifically designed to be readily actuated manually within the confines of a vehicle in which the assembly is disposed, which includes an actuating mechanism of the manual type movable past a center position in order to transform the assembly from a bed to a seat and which utilizes a minimum of components and complex parts.

SUMMARY OF THE INVENTION

The convertible van sofa of the instant invention has been specifically designed for use in a vehicle such as a van and may be converted between a seat defining assembly and a bed defining assembly. Conventionally, convertible seat-bed assemblies are mounted within vans adjacent the rear doors thereof and usually are constructed in a manner such that storage for various articles may be had beneath the assembly when it is in a seat defining position. Accordingly, it is important a convertible seat-bed assembly be constructed in a manner to maintain maximum storage area thereunder and further in a manner whereby the assembly may be transformed from a bed to a seat independent of any portion of the assembly projecting excessively rearwardly therefrom for interference with the rear doors of the van.

The convertible seat-bed assembly includes a lever type operating member for converting the assembly between a seat and a bed and the operating member includes a free handle end which is disposed immediately under one end of the forward marginal edge of the seat-bed assembly when it defines a seat and which is swung outwardly of the forward marginal edge and to a position closely underlying the other end of the forward marginal edge of the assembly when the latter defines a bed. Therefore, the operating member is readily accessible and operable.

In addition, the operating lever is swingable to a slightly over center position as it is actuated to convert the assembly from a bed to a seat and the over center position of the operating member assures that the elevated backrest portion of the assembly is remained in an elevated position.

The main object of this invention is to provide a convertible seat-bed assembly specifically designed for usage in a van type motor vehicle.

Another object of this invention is to provide a convertible seat-bed assembly constructed in a manner whereby it may be readily manually converted between a seat defining structure and a bed defining structure.

Yet another important object of this invention, in accordance with the immediately preceding object is to provide a convertible-bed assembly which may be converted between a seat defining arrangement a bed defining arrangement independent of excessive projection of any portion of the assembly projecting outwardly of a predetermined marginal portion of the assembly during the process of conversion between a seat defining arrangement and a bed defining arrangement.

A further object of this invention is to provide a convertible seat-bed assembly in accordance with the preceding objects and including a manual operator therefore of the lever type and which may be swung between limit positions in order to convert the assembly between seat and bed defining arrangements.

Yet another object of this invention, in accordance with the immediately preceding object, is to provide a manual operator of the lever type and including a free handle defining end which is disposed closely adjacent and beneath the forward marginal edge of the assembly in each of the limit positions of the manual operator and with the handle defining end being swingable outwardly from beneath the forward marginal edge of the assembly and then back inward beneath the forward marginal edge of the assembly during swinging of the lever type operator in order to convert the assembly from a seat to a bed.

Still another important object of this invention is to provide a convertible seat-bed assembly including seat and seat back supports disposed in side-by-side closely laterally spaced relation when the assembly is in a bed defining configuration and with the supports mounted from a main frame of the assembly in such a manner that manual actuation of the operator to convert the assembly from a bed to a seat enables immediate opposite substantially vertical movement of the adjacent marginal portions of the seat and seat back supports.

A final object of this invention to be specifically enumerated herein is to provide a convertible seat-bed assembly in accordance with the preceding objects and which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a fragmentary enlarged vertical sectional view taken substantially upon the plane indicated by the section line 4—4 FIG. 3;

FIG. 5 is an enlarged fragmentary vertical sectional view similar to the upper righthand portion of FIG. 2 and illustrating the manner in which the seat support may be oscillated about a horizontal axis upon initial actuation of the operating lever of the invention to shift the assembly components from a bed defining configuration to a seat defining configuration; and FIG. 6 is a fragmentary enlarged perspective view illustrating the manner in which the bell-crank type manual operator lever of the assembly is swingable between the limits of oscillation thereof.

DESCRIPTION OF THE PREFERRED EMBODIMENT

Figure 1:
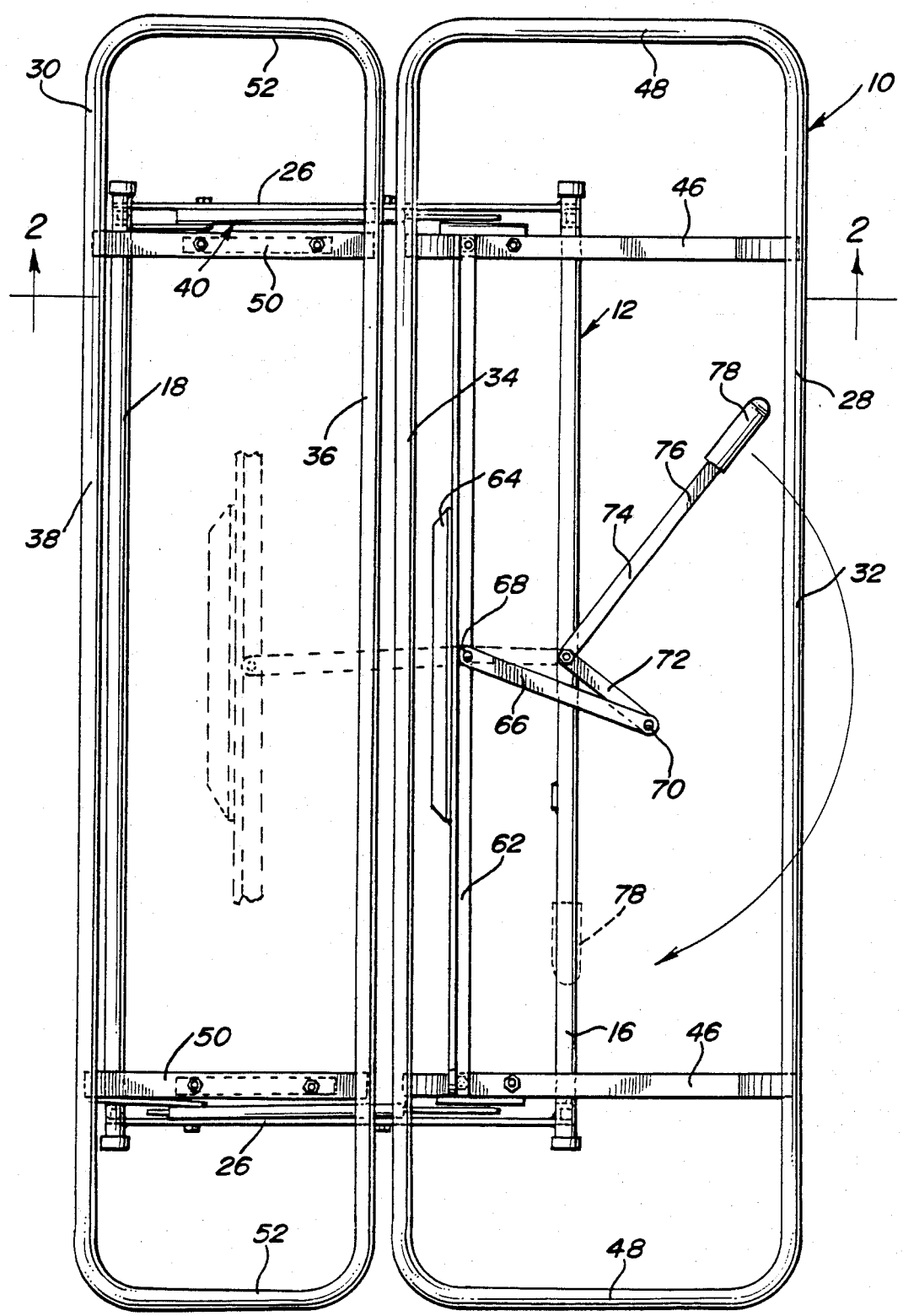
FIG. 1 is a top plan view of the convertible seat-bed assembly of the instant invention with the cushions thereof removed and the assembly in a bed defining configuration.

Referring now more specifically to the drawings the numeral 10 generally designates a convertible seat-bed assembly or van sofa constructed in accordance with the present invention. The assembly 10 includes a base frame referred to in general by the reference numeral 12 incorporating a pair of opposite end upstanding U-shaped frame members 14 and a pair of front and rear longitudinal members 16 and 18 extending between and interconnecting the upper ends of the front and rear legs of the frames 14. The lower horizontal bight portions 20 of the U-shaped frame members 14 may be secured to the floor 22 of a van through the utilization of fasteners 24 secured downwardly through the bight portions 20 and through the floor 22. The U-shaped frame members and the longitudinal members 16 and 18 are constructed of square tubular stock. Also, the upper ends of the legs of the U-shaped frame members 14 at opposite ends of the base frame 12 are interconnected by forwardly and upwardly inclined front-to-rear extending brace members 26.

The assembly 10 includes a seat support or frame 28 and a seat back support or frame 30. The frames 28 and 30 also are constructed of square tubular stock and are rectangular in plan shape with the corners thereof being smoothly curved, the frame 28 being approximately one-third greater in width (when viewed in plan) then the width of the frame 30.

The frame 28 includes front and rear longitudinal marginal portions 32 and 34 and the frame 30 includes opposite side longitudinal marginal portions 36 and 38 which are disposed forward and rearward, respectively, of each other when the frame 18 is horizontally disposed. It will be noted from FIG. 1 of the drawings that when both frames 28 and 30 are horizontally disposed, the marginal portions 34 and 36 are horizontally registered and closely oppose each other.

Each of the brace members 26 includes an elongated guide and follower assembly 40 secured thereto and extending therealong. Each guide and follower assembly includes a channel shaped guide member 42 securely mounted to and extending along the corresponding brace member 26 and an elongated follower member 44 guidingly supported from the corresponding guide member for movement therealong.

The frame 28 includes front to rear extending brace members 46 adjacent and spaced inward of opposite end marginal portions of the frame 28 and the frame 30 includes corresponding transverse brace members 50 adjacent but spaced inward from the end marginal portions 52 of the frame 30.

The brace members 46 include depending mounting brackets 54 supported therefrom pivotally mounted from the corresponding follower members 44 as at 56. The brackets 56 are mounted from the rear end portions cf the brace members 46 and those portions of the brace members 46 which project forwardly beyond the mounting brackets 54 overlie and are slidingly supported from the corresponding ends of the longitudinal member 16. Downward abutting engagement of the forward end portions of the brace members 46 with the longitudinal member 16 limit clockwise angular displacement of the frame 28 as viewed in FIG. 5 and counterclockwise angular displacement of the frame 28 to the position thereof indicated in phantom lines in FIG. 5 is limited by an abutment 60 carried by each follower member 44 and abuttingly engageable by an opposing edge of the corresponding mounting bracket 54.

The rear ends of the brace members 46 are also interconnected by a longitudinal angle member 62 extending and secured therebetween and the longitudinal midportion of the angle member 62 is braced by a second angle member 64 secured thereto in mirror image relation.

One end of an operating link 66 is pivotally anchored to the longitudinal midportion of the angle member 62 as at 68 and the other end of the link 66 is pivotally connected as at 70 to the free end of the short arm 72 of a belt crank 74 also incorporating a long arm 76 defining a handle 78 on its free end.

When the assembly 10 has its components arranged to define a bed, the handle 78 closely underlies and is spaced slightly inwardly of the marginal portion 32 adjacent one of the brace members 46. In order to shift the frames 28 and 30 to the seat defining positions, the handle is grasped and swung in a clookwise direction as viewed in FIG. 1 of the drawings to the phantom line position thereof illustrated in FIG. 1. In this position, the long arm 76 closely overlies and parallels the member 16 adjacent the opposite end of the frame 28. However, the handle 78 still is spaced only slightly inwardly of the marginal portion 32, inasmuch as the frame 28 is shifted rearwardly from the position thereof illustrated in solid lines in FIG. 1 when the frames 28 and 30 are shifted from their bed defining positions to their seat defining positions.

With attention now invited more specifically to FIG. 6 of the drawings, it may be seen that the member 16 includes an abutment flange 80 with which the long arm 76 is abuttingly engageable when the bell crank 74 is swung to the position thereof with the frames 28 and 30 in the seat defining positions.

Figure 3:
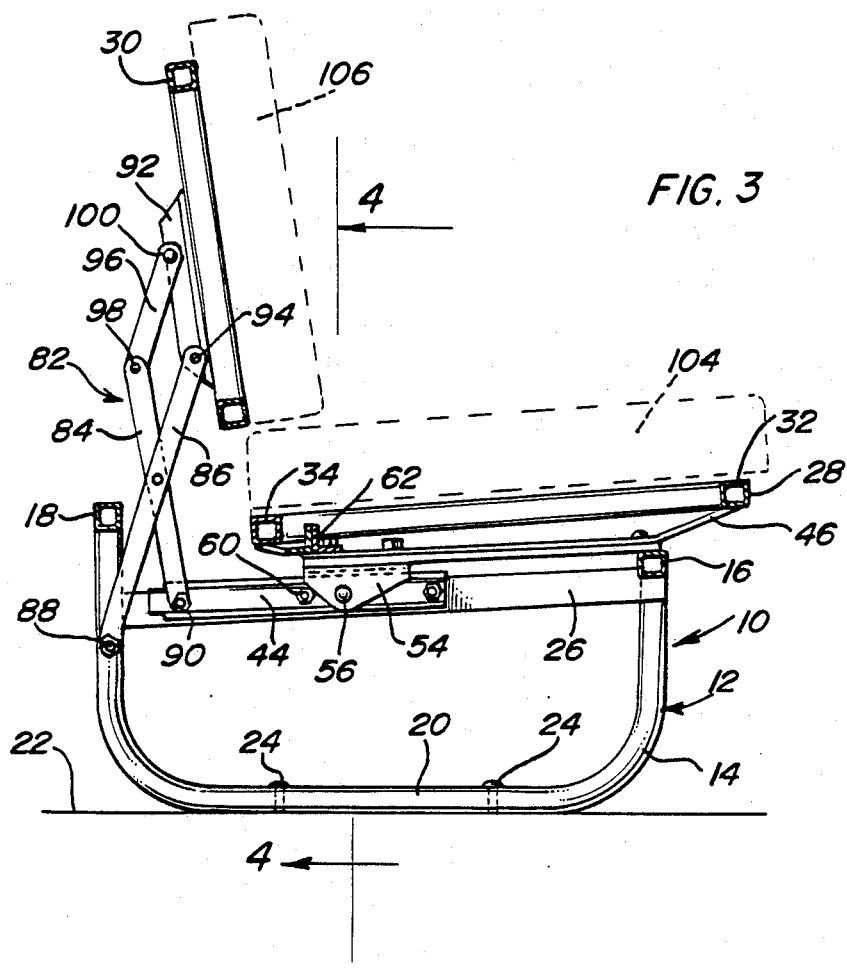
FIG. 3 is a vertical sectional view similar to FIG. 2 but with the assembly in a seat defining configuration.
Figure 2:
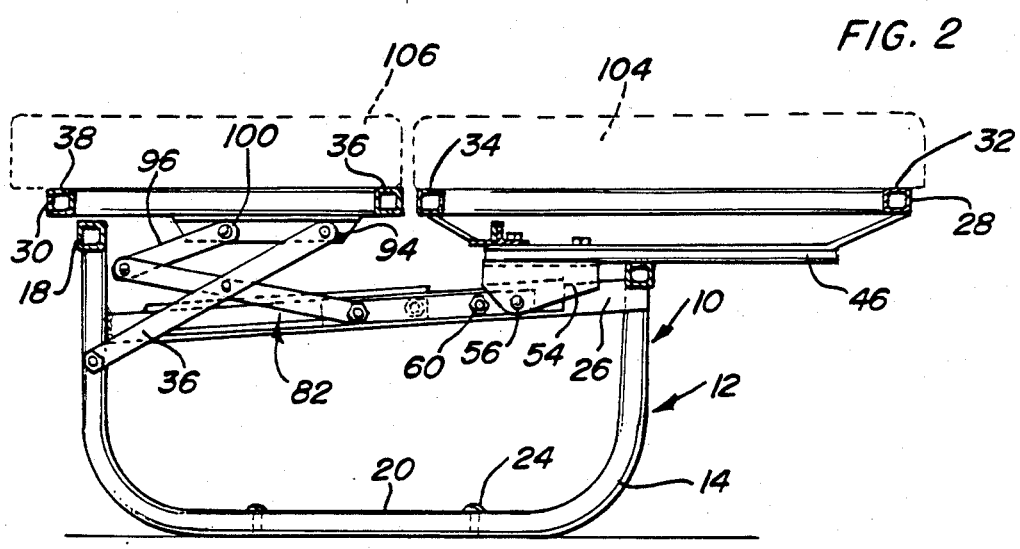
FIG. 2 is a vertical sectional view taken substantially upon the plane indicated by the section line 2—2 of FIG. 1.

With attention now invited more specifically to FIGS. 2 and 3, it may be seen that a pair of lazy tong linkages 82 are provided with each linkage including a pair of crossed and pivotally connected links 84 and 86. In FIG. 3 of the drawings the links 84 and 86 are illustrated in upstanding positions and the lower end of each link 86 is pivotally attached to the rear upright leg of the corresponding U-shaped frame 14 as at 88 and the lower end of each link 84 is pivotally attached as at 90 to the rear end of the corresponding follower member 44. A pair of mounting brackets 92 are carried by the brace members 50 and the upper end of each link 86 is pivotally attached as at 94 to the corresponding mounting bracket 92 and the upper end of each link 84 is pivotally connected to the lower end of an upstanding link 96 as at 98, the upper end of each link 98 being pivotally secured as at 100 to an upper portion of the corresponding mounting bracket 92.

When the frame 28 is shifted (through utilization of the bell crank 74) from the position thereof illustrated in FIG. 3 to the position illustrated in FIG. 2, the lazy tong linkage 82 lowers and rotates the frame 30 from the position illustrated in FIG. 3 to the position thereof illustrated in FIG. 2 with the frame 30 closely opposing and horizontally registered with the frame 28.

When the bell crank 74 is swung from the solid line position illustrated in FIG. 1 to the phantom line position illustrated in FIG. 1 in order to shift the frames 28 and 30 to the positions thereof illustrated in FIG. 3, initial rearward thrust on the angle member 62 by the link 66 causes the frame 28 to rotate about the pivot connections as at 56 from the solid line position illustrated in FIG. 5 to the phantom line position illustrated in FIG. 5 and the frame 30 is initially abruptly elevated. In this manner, the rear marginal portion 34 of the frame 28 is lowered and the forward marginal portion 36 of the frame 30 is elevated sufficiently whereby the cushions 104 and 106 supported from the frames 28 and 30 do not interfere with each other.

Also, when the bell crank 74 is swung to the phantom line position thereof in FIG. 1, the short arm 72 and link 66 are in an over center position. This assures that the seat back frame 30 will remain in an upright position.

Further, it may be noted from FIGS. 3 and 4 that the seat back support frame 30 is supported, independently of the frame 28 from the lazy tong linkages 82, that the seat support frame 28 is supported, positively, only by the pivot connections 56 and that the number and complexity of the parts of assembly 10 are at a minimum.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

I claim:

1. A convertible seat-bed assembly including a base frame, a seat support and a seat back support, linkage means connected between said base frame and seat back support and seat support for movement of said supports between seat defining positions with the seat support in a generally horizontal position and the seat back support in a generally upright position and a bed defining position with said seat and seat back suports disposed horizontally in side-by-side relation, said seat support, when being shifted from said seat defining position toward said bed defining position being laterally horizontally shifted in a first direction away from said seat back support and the latter, when being shifted from said seat defining position to said bed defining position, being generally vertically lowered and angularly displaced in a manner to swing the lower portion of the seat back support in said direction and the upper portion of said seat back support in a second opposite direction, said linkage means including opposite side followers mounted from said base frame for guided generally horizontal back and forth movement relative thereto in said first and second directions, lazy tong means connected between said seat back support and said base frame and the followers, support portions rigidly supported by opposite sides of said seat support, depending downwardly therefrom and pivotally attached, below said seat support, to the corresponding opposite side followers for limited angular displacement relative to said followers about a horizontal pivot axis extending therebetween, and operating means for shifting said seat support and seat back support between said seat defining and bed defining positions, said operating means connected between said base frame and said seat support above said pivot axis, and being selectively operable to apply thrust forces to said seat support at a point thereon spaced above said pivot axis in said first and second directions, whereby a force applied to said seat support in said opposite direction will initially cause said seat support to rock rearwardly about said pivot axis and thereafter cause shifting of said followers rearwardly relative to said frame and rearward shifting of said seat support and upward displacement of said seat back support relative to said frame.

2. The assembly of claim 1 wherein said operating means includes an operating lever pivotally supported from said base frame for oscillation relative thereto about an upright axis, said seat support including a front margin paralleling said pivot axis and remote from said seat back supporting, said lever including a free handle defining end swingable between limit positions closely adjacent, upwardly of and underlying first and second longitudinally spaced portions of said front margin of said seat support to effect shifting of said seat and seat back supports between said seat and bed defining positions, whereby said free handle defining end is readily accessible, but disposed in position urderlying the front margin of said seat support, immediately prior to swinging of said lever handle defining free end from either limit position toward the other limit position.

3. The assembly of claim 2 wherein said operating lever includes a force applying end remote from said free handle defining end, a conecting link extending and pivotally connected between said force applying end and said seat support, said lever and connecting link being disposed in over center limit positions thereof when said lever is pivoted relative to said base frame to shift said seat and seat back supports from said bed defining positions to said seat defining positions.

4. The assembly of claim 1 wherein the pivotal attachment of said seat support portions to said followers comprises the sole positive connection between said seat support portions and base frame.

5. A convertible seat-bed assembly including a base frame defining front and rear margins, a seat support including front and rear margins and a seat back support, mounting means supporting said suports from said frame for movement between first seat defining positions with said seat support generally horizontally disposed and projecting slightly forward of said front margin of said base frame and said seat back support disposed in upstanding position spaced slightly above said seat support rear margin and second bed defining positions with said seat support projecting further forward of said base frame front margin and said seat back support disposed in horizontal position closely rearwardly of said rear margin of said seat support, and manualy actuatable force means operatively connected between said base frame and the seat support for shifting said supports between said first and second positions, said mounting means and force means including coacting means, upon actuation of said force means to shift said supports from said second positions to said first positions, operative to initially downwardly swing the rear margin of said seat support and thereafter simultaneously rearwardly displace said seat support and abruptly upwardly displace said seat back support, whereby interference between cushions mounted upon said seat support and said seat back support is avoided during shifting of said seat and seat back supports from said second positions to said first positions.

6. The assembly of claim 5 wherein said mounting means includes means establishing a pivot connection between a lower rear marginal portion of said seat support and front to rear shiftable followers carried by said base frame.

7. The assembly of claim 6 wherein said pivot connection defines the sole positive connection between said seat support and said base frame.

8. The assembly of claim 6 wherein said mounting means includes lazy tong linkages connected between said base frame, seat back support and followers supporting said seat back support for guided shifting relative to said base frame between the first and second positions of said seat back support.

9. The assembly of claim 8 wherein said pivot connection defines the sole positive connection between said seat support and said base frame.

10. The assembly of claim 6 wherein the forward margin of said seat support overlies and supportingly slidingly engages said front margin of said base frame.

11. The assembly of claim 5 wherein said force means includes an operating bell crank pivotally suported from said base frame for oscillation relative thereto about an upright axis, said bell crank including a first arm pivotally connected to said seat support and a second arm including a free handle defining end swingable between limit positions closely adjacent and underlying first and second longitudinally spaced portions of said first margin of said seat support to effect shifting of said seat and seat back supports between said seat and bed defining positions, whereby said free handle defining end is readily accessible to effect shifting of said seat and seat back supports between said seat and bed defining positions, whereby said free handle defining end is readily accessible, but disposed in position underlying the front marging of said seat support, immediately prior to swinging of said lever handle defining free end from either limit position toward the other limit position.

* * * * *